March 31, 1953 M. J. REED 2,633,180
ARMREST

Filed April 13, 1951 2 SHEETS—SHEET 1

INVENTOR
Maurice J. Reed
BY Stevens, Davis, Miller & Mosher
ATTORNEYS

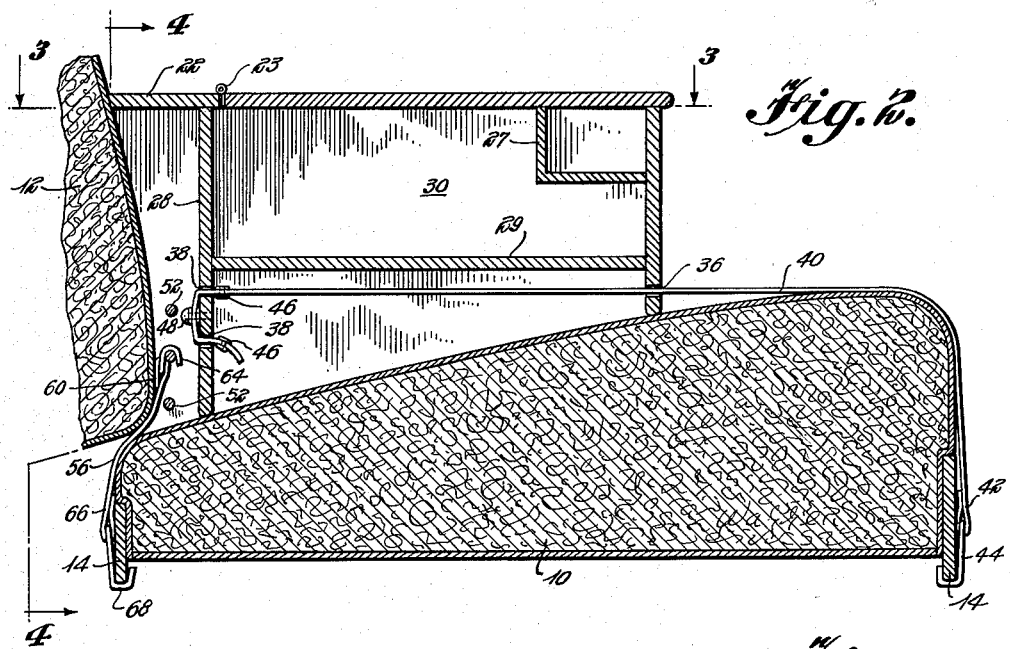

Patented Mar. 31, 1953

2,633,180

UNITED STATES PATENT OFFICE 2,633,180

ARMREST

Maurice J. Reed, Red Bank, N. J.

Application April 13, 1951, Serial No. 220,796

9 Claims. (Cl. 155—112)

This invention relates to an arm rest attachment for use with seats not normally provided with arm rests. More particularly this invention relates to an arm rest for use with elongated seats of automobiles, and other vehicles provided for joint use by a plurality of persons.

Accordingly this invention provides a self-supporting rest which may be operatively installed on seat cushions without alteration or modification of the seat structure. Further this invention provides a rest which is arranged for adjustable disposal along an elongated seat for variably dividing the seat to fittedly accommodate the persons who are to occupy the seat. In addition the arm rest of the present invention provides a container divided into compartments for storing sundry articles for the use of the persons who are occupying the seat.

It is therefore an object of this invention to provide an arm rest for use with seats of automobiles and other vehicles which is characterized by a simple structure.

Further, it is an object of this invention to provide an arm rest for the above purpose which may be readily placed in position on the seat and which may be as readily removed.

It is still a further object of this invention to provide an arm rest for the above purpose which possesses the features of adjustability so that the arm rest can be easily adapted to the use of the persons occupying the seat.

Other and further objects of this invention will become apparent upon a detailed consideration of the following description when taken in conjunction with the drawing in which:

Figure 2 is a view in vertical section of Figure 1 taken through the longitudinal axis of the arm rest;

Figure 4 is a view in vertical elevation of Figure 2 taken along line 4—4; and

Figure 5 is a view similar to Figure 2 taken on the outside of the arm rest showing a modified means for adjusting the relative position of the arm rest with respect to the seat.

Figure 1:
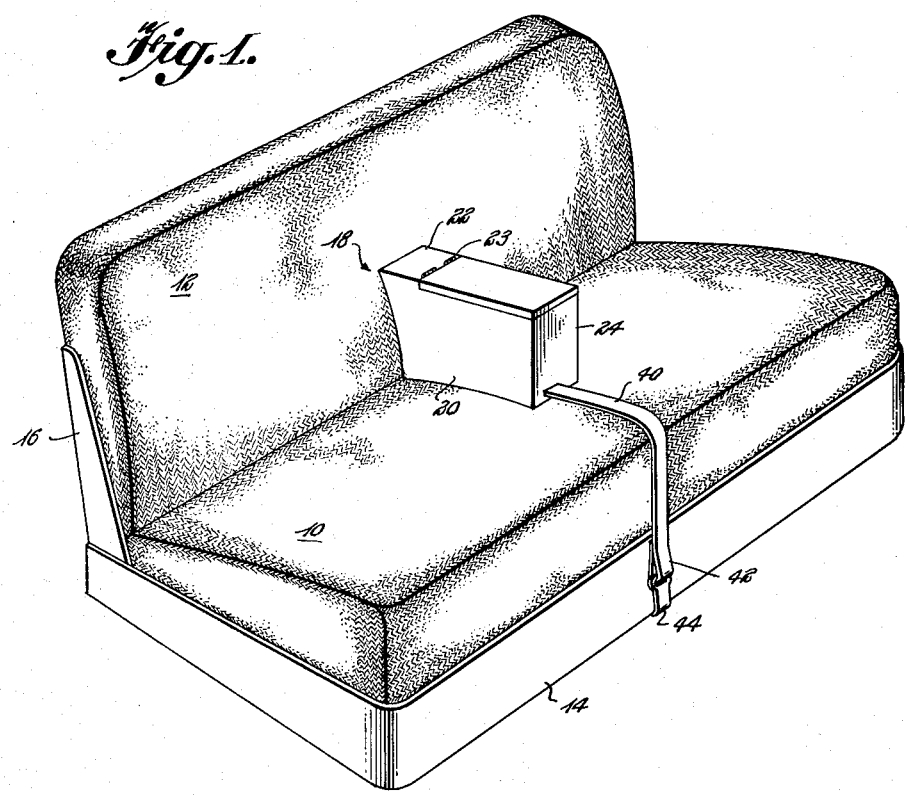
Figure 1 is a view in perspective showing an elongated seat with an arm rest of the present invention.
Figure 3:
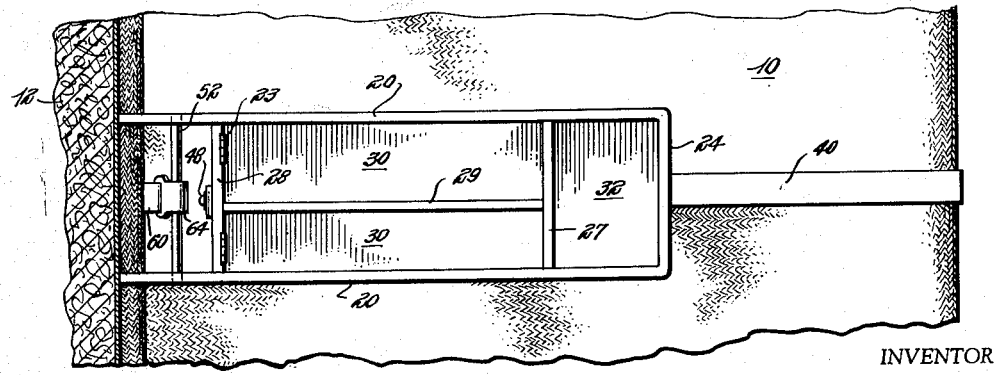
Figure 3 is a view in horizontal section of Figure 2 taken along line 3—3.

Referring now to the drawing, Figures 1 to 4 inclusive show the arm rest of the present invention. There is shown in Figure 1 a seat consisting of a bottom cushion 10 and a back cushion 12. A flange 14 is fitted around the base of the bottom 10 and is provided with a projection 16 to aid in supporting the back 12. This structure is similar to that employed in vehicle seats generally. An arm rest member generally indicated as 18 is placed upon a seat structure as that described. The member 18 rests on bottom cushion 10 and fits against the back 12. The arm rest 18 consists of side walls 20, a top wall 22, and a front wall 24 which define a box-like structure. The forward end of the top wall 22 is hingedly connected at 23 to the rear part of the top wall 22 to provide a closure for the box-like structure 18. Within the box-like structure 18 is mounted a rear partition 28 and a horizontal and vertical longitudinal partition 29 which divides the space into large compartments 30. Forward partitions 27 set off a second smaller compartment 32.

Front wall 24 of the box-like structure 18 is arranged with a slot 36. The rear partition 28 is provided with two slots 38 below the longitudinal partition 29. A belting element 40 such as a canvas belt is arranged at one end in the form of a loop 42 in which is mounted a steel hook 44 and at the other end with a plurality of spaced eyelets 46. A pin 48 is mounted in the partition 28. As shown in Figure 2 the belting element 40 is connected to the bottom of flange 14 by means of hook 44 and the other end of belting 44 is buckled to or engaged with the box-like member 18 by means of pins 48 passing through one of the eyelets 46.

At the rear of the arm rest between the side walls 20 is located a plurality of vertically spaced cross rods 52. A second belting member 56 which can be a stiff canvas belt is arranged at one end with a loop 60 in which is mounted a steel hook 64. The other end of belting member 56 is also arranged with a loop 66 in which is mounted another steel hook 68. The hook 64 is caught on one of the cross rods 52 and the hook 68 is caught beneath the flange 14. In this manner the arm rest is securely attached at both its forward and rear end.

In Figure 5 is shown a modified way in which the forward belting member 40 may be adjustably mounted together with the arm rest. The belting member 40 is provided on one end with a loop 42 and a steel hook 44, as above described, for engaging the flange 14. The other end of belting member 40 is provided with a loop through which fits a pin 70. The sides 20 of the arm rest are provided with a toothed slot 72. The belting member 40 passes around a cross pin 74 located between the side walls 20 of the arm rest and the pin 70 holds the belting in the teeth of the slot 72. In this manner the belting member 40 can be readily adjusted from the outside of the arm rest by manipulating pin 70 with regard to the toothed slot 72.

In placing the arm rest of the present invention upon the vehicle seat, the belting member 56 is initially positioned so that the hook 68 engages the flange 14 of the seat and the hook 64 is lying upon the seat. The box-like structure with the belting member 40 mounted therein is then placed so that the hook 64 engages one of the cross pins 52. The arm rest is then placed in the position generally shown in Figure 1. The front part of the seat 10 is then depressed and the hook 44 located on the end of belting member 40 is engaged with the flange 14 which runs around the seat 10. This completes the operation of placing the arm rest upon a vehicle seat and it is now as shown in Figure 1.

While this invention has been described in a specific embodiment it is nevertheless understood that various changes and modifications obvious to one skilled in the art are within the spirit, scope and contemplation of the present invention.

What is claimed is:

1. An arm rest for an elongated seat including a bottom cushion and a back cushion that comprises a member adapted to be placed on a bottom cushion of an elongated seat, a pin mounted in said member, a belting element, means on one end of said belting element adapted to engage the front of said bottom cushion, adjustable means on the other end of said belting element engaging with said member by cooperating with said pin, and adjustable means adapted to engage said member with the back of said bottom cushion.

2. An arm rest for an elongated seat including a bottom cushion and a back cushion that comprises a member adapted to be placed on a bottom cushion of an elongated seat, a pin mounted in said member, a plurality of rods mounted in said member, a belting element, means on one end of said belting element adapted to engage the front of said bottom cushion, adjustable means on the other end of said belting element engaging with said member by cooperating with said pin, a second belting element, means on one end of said second belting element adapted to engage the back of said bottom cushion, and means on the other end of said second belting element adjustably mounted with said rods.

3. An arm rest as defined in claim 1 wherein said member defines an internal space adapted for the storing of articles.

4. An arm rest for an elongated seat including a bottom cushion and a back cushion that comprises a member adapted to be placed on a bottom cushion of an elongated seat, a pin associated with said member, a belting element, means on one end of said belting element adapted to engage the front of said bottom cushion, adjustable means on the other end of said belting element engaging with said member by cooperating with said pin, and means adapted to engage said member with the back of said bottom cushion.

5. An arm rest for an elongated seat including a bottom cushion and a back cushion that comprises a box-like member adapted to be placed on a bottom cushion of an elongated seat, a pin mounted at the rear of said member, a belt, a hook on one end of said belt adapted to engage the front of said bottom cushion, adjustable means on the other end of said belt engaging with said member by cooperating with said pin, and adjustable means adapted to engage said member with the back of said bottom cushion.

6. An arm rest for an elongated seat including a bottom cushion and a back cushion that comprises a box-like member adapted to be placed on a bottom cushion of an elongated seat, a pin mounted at the rear of said member, a belt, a hook on one end of said belt adapted to engage the front of said bottom cushion, a plurality of spaced eyelets on the other end of the belt adjustably engaging with said member by cooperating with said pin, and adjustable means adapted to engage said member with the back of said bottom cushion.

7. An arm rest for an elongated seat including a bottom cushion and a back cushion that comprises a box-like member adapted to be placed on a bottom cushion of an elongated seat, a pin mounted in said member, a plurality of rods mounted in said member, a belt, a hook on one end of said belt adapted to engage the front of said bottom cushion, adjustable means on the other end of said belt engaging with said member by cooperation with said pin, a second belt, a hook mounted on said second belt adapted to engage the back of said bottom cushion, and means on the other end of said second belt adjustably mounted with said rods.

8. An arm rest for an elongated seat including a bottom cushion and a back cushion that comprises a box-like member adapted to be placed on a bottom cushion of an elongated seat, a pin mounted in said member, a plurality of rods mounted in said member, a plurality of spaced eyelets on the other end of the belt adjustably engaging with said member by cooperating with said pin, a second belt, a hook mounted on said second belt adapted to engage the back of said bottom cushion, and a hook on the other end of said second belt adjustably mounted with said rods.

9. An arm rest for an elongated seat including a bottom cushion and a back cushion that comprises a member adapted to be placed on a bottom cushion of an elongated seat, a toothed slot in said member, a belt, a hook on one end of said belt adapted to engage the front of said bottom cushion, a loop on the other end of said belt, a pin received in said loop for adjustably engaging with said member by cooperating with said toothed slot, and means adapted to engage said member with the back of said bottom cushion.

MAURICE J. REED.

REFERENCES CITED

The following references are of record in the file of this patent:

UNITED STATES PATENTS

| Number | Name | Date |
|---|---|---|
| 2,086,244 | Smith | July 6, 1937 |
| 2,160,282 | Rehg | May 30, 1939 |
| 2,524,909 | Hines | Oct. 10, 1950 |
| 2,565,988 | Price | Aug. 28, 1951 |